(12) United States Patent
Zhang et al.

(10) Patent No.: US 11,700,663 B2
(45) Date of Patent: Jul. 11, 2023

(54) CONTROL METHOD OF USER EQUIPMENT AND USER EQUIPMENT

(71) Applicants: SHARP KABUSHIKI KAISHA, Sakai (JP); FG Innovation Company Limited, Tuen Mun (HK)

(72) Inventors: Chongming Zhang, Shanghai (CN); Renmao Liu, Shanghai (CN); Shohei Yamada, Sakai (JP)

(73) Assignees: SHARP KABUSHIKI KAISHA, Osaka (JP); FG Innovation Company Limited, New Territories (HK)

( * ) Notice: Subject to any disclaimer, the term of this patent is extended or adjusted under 35 U.S.C. 154(b) by 191 days.

(21) Appl. No.: 17/258,970

(22) PCT Filed: Jul. 9, 2019

(86) PCT No.: PCT/CN2019/095232
§ 371 (c)(1),
(2) Date: Jan. 8, 2021

(87) PCT Pub. No.: WO2020/011157
PCT Pub. Date: Jan. 16, 2020

(65) Prior Publication Data
US 2021/0127447 A1  Apr. 29, 2021

(30) Foreign Application Priority Data
Jul. 10, 2018 (CN) .......................... 201810754064.9

(51) Int. Cl.
*H04W 76/19* (2018.01)
*H04W 76/15* (2018.01)
(Continued)

(52) U.S. Cl.
CPC ........... *H04W 76/19* (2018.02); *H04W 76/15* (2018.02); *H04W 76/18* (2018.02); *H04W 76/27* (2018.02); *H04W 80/02* (2013.01); *H04W 84/18* (2013.01)

(58) Field of Classification Search
CPC ..... H04W 76/19; H04W 76/15; H04W 76/18; H04W 76/27; H04W 80/02; H04W 84/18; H04W 4/50
See application file for complete search history.

(56) References Cited

U.S. PATENT DOCUMENTS 10,959,279 B2 * 3/2021 Orsino ................ H04W 76/38
2018/0035483 A1 * 2/2018 Nagasaka ........... H04W 28/085
(Continued)

FOREIGN PATENT DOCUMENTS

| CN | 104219787 A | 12/2014 |
|---|---|---|
| CN | 105917716 A | 8/2016 |
| CN | 107690162 A | 2/2018 |

OTHER PUBLICATIONS

Ericsson, MCG failure handling in case of NE-DC (TP to 37.340), 3GPP TSG-RAN WG2#AH1807 R2-1809949, Montreal, Canada, Jul. 2-6, 2018, the whole document.
(Continued)

*Primary Examiner* — Will W Lin
(74) *Attorney, Agent, or Firm* — ScienBiziP, P.C.

(57) ABSTRACT

A control method for User Equipment (UE) comprising: performing communication with a master cell group (MCG) and a secondary cell group (SCG); detecting whether a failure occurred in the MCG transmission; if it is detected that the failure has occurred in the MCG transmission, executing an MCG failure processing operation; and sending a message to a base station, the message indicating information related to the failure.

18 Claims, 4 Drawing Sheets

(51) Int. Cl.
*H04W 76/18* (2018.01)
*H04W 76/27* (2018.01)
*H04W 80/02* (2009.01)
*H04W 84/18* (2009.01)

(56) References Cited

U.S. PATENT DOCUMENTS

| | | | |
|---|---|---|---|
| 2018/0160339 A1* | 6/2018 | Wu | H04W 36/0069 |
| 2018/0184482 A1* | 6/2018 | Susitaival | H04W 76/27 |
| 2019/0182689 A1* | 6/2019 | Martin | H04W 36/305 |
| 2019/0289510 A1* | 9/2019 | Rugeland | H04W 36/0069 |
| 2019/0356536 A1* | 11/2019 | Lee | H04L 41/0654 |
| 2020/0107390 A1* | 4/2020 | Hwang | H04W 36/0069 |
| 2020/0169887 A1* | 5/2020 | Wager | H04W 76/27 |
| 2020/0205003 A1* | 6/2020 | Ingale | H04L 9/3242 |
| 2021/0068186 A1* | 3/2021 | Wu | H04W 76/18 |
| 2021/0153281 A1* | 5/2021 | Deogun | H04W 76/18 |

OTHER PUBLICATIONS

Ericsson, RLM and RLF in case of LTE-NR tight interworking, 3GPP TSG-RAN WG2 #97bis R2-1702711, Spokane, USA, Feb. 3-7, 2017, the whole document.

Huawei et al., Discussion on MCG/SCG failure handling for NE-DC, 3GPP TSG-RAN WG2#AH1807 R2-1810704, Montreal, Canada, Jul. 2-6, 2018, the whole document.

LG Electronics Inc., Supplementary SRB in MCG failure for NR, 3GPP TSG-RAN WG2 #97 R2-1701639, Athens, Greece, Feb. 13-17, 2017, the whole document.

* cited by examiner

CONTROL METHOD OF USER EQUIPMENT AND USER EQUIPMENT

FIELD

The present disclosure is generally related to wireless communications, and more particularly, the present disclosure relates to and control method of user equipment and user equipment.

BACKGROUND

As mobile communication grows and its technology improves, the world is moving toward a community that is a completely interconnected network and in which anyone or anything can obtain information and share data at anytime and anywhere. To meet the requirements of enhanced Mobile Broadband (eMBB) and massive Machine-Type Communication (mMTC), the next-generation wireless communication technology (5G) is researching the possible enhancements in technology for users in dual connectivity or multi connectivity (RP-181469 New WID on DC and CA enhancements).

Dual connectivity or multi connectivity refers to a user equipment (UE) operating in connected status and building physical channels with more than one network node, and performing data transmission. Network nodes may include a Master Node (MN) and a Secondary Node (SN). The MN is executed by a Next Generation NodeB (gNB)/evolved NodeB (eNB)/next generation-eNB (ng-eNB), and the serving cell group controlled by MN is called the Master Cell Group (MCG). Correspondingly, the SN is executed by one or more gNB/eNB/ng-eNB, and the serving cell group controlled by SN is called the Secondary Cell Group (SCG).

The UE that is configured with dual connectivity or multi connectivity may perform communication via MCG or SCG. In present disclosure, when there is a link transmission problem that occurs in the MCG, even though the UE is able to transmit normally via the SCG, the UE is still required to trigger a radio resource control (RRC) connection re-establishment procedure. Upon cell reselection, the UE selects a suitable cell to perform link connection resume and simultaneously releases an SCG that has been configured previously. The re-establishment procedure requires a period of time to run, and may fail. The re-establishment procedure causes disconnection in UE transmission, which increases transmission delay.

To address these issues, the present disclosure provides, when a failure occurs in an MCG link, if an SCG is able to operate normally, then the UE may report message(s) to the network side via the SCG to indicate that the failure has occurred in the MCG. Subsequently, the network side sends an RRC reconfiguration message to the UE via the SCG. The UE may continue to operate via reconfiguration, and, thereby, minimizes the effects of link disconnection.

The problem to be solved involves how the UE processes present bearer(s) when a problem occurred in MCG transmission. Correspondingly, how to resume logic link transmission after the UE receives an RRC reconfiguration message also needs to be addressed. Additionally, when the MCG transmission problem has occurred and before the UE receives the reconfiguration message, if a problem also occurred in the SCG link, how the UE operates also needs to be solved.

SUMMARY

The present disclosure proposes solutions to the following problems: how the UE processes present bearer(s) when a problem occurred in MCG transmission; how to resume logic link transmission after the UE receives an RRC reconfiguration message; and when the MCG transmission problem has occurred and before the UE receives reconfiguration message, if a problem also occurred in the SCG link, how the UE operates. More specifically, the present disclosure provides a control method for user equipment and user equipment.

According to a first aspect of the present disclosure, there is provided a control method for UE, the method comprising: performing communication with a master cell group (MCG) and a secondary cell group (SCG); detecting whether a failure occurred in an MCG transmission; if it is detected that the failure has occurred in the MCG transmission, executing an MCG failure processing operation; and sending a message to a base station, the message indicating information related to the failure.

According to the disclosed control method, if it is detected that the failure has occurred, initiating an MCG failure informing procedure of sending a message that indicates information related to the failure, during the MCG failure informing procedure.

According to the disclosed control method, the MCG failure processing operation includes at least one of the following: suspending all signaling radio bearer (SRB) transmission via the MCG; suspending all data radio bearer (DRB) transmission via the MCG; suspending all SRB transmission via the MCG except for SRB0; suspending split SRB transmission via the MCG; suspending all MCG SRB transmission via the MCG except for SRB0; and suspending all MCG Data Radio Bearer (DRB) transmission via the MCG.

According to the disclosed control method, if it is detected that the failure has occurred or when a message is sent to a base station that indicates information related to the failure, the method further comprises: starting a timer; during the running of the timer, if it is detected that a failure has occurred in the SCG, triggering a radio resource control (RRC) connection re-establishment procedure; during the running of the timer, if an RRC reconfiguration message is received, stopping the timer; and when the timer expires, triggering the RRC connection re-establishment procedure.

According to the disclosed control method, the failure that occurred in the MCG transmission includes at least one of the following conditions: an MCG wireless connection failure; an MCG lower layer indicating integrity protection check failure; RLC instructions of the MCG reach a maximum allowable number of transmission times or a maximum allowable number of re-transmission times; and an MCG MAC layer reporting a random access problem; and the failure that occurred in SCG includes at least one of the following conditions: an SCG wireless connection failure; an SCG lowest layer indicating integrity protection check failure; RLC instructions of the SCG reach a maximum allowable number of transmission times or a maximum allowable number of re-transmission times; and an SCG MAC indicating a random access problem.

According to the disclosed control method, if it is detected that the failure has occurred, the method further comprises: if the UE is configured with a resume timer or a time period of the resume timer, executing the MCG failure processing operation, sending a message to a base station that indicates information related to the failure, and starting the resume timer; and if the UE is not configured with a resume timer or a time period for the resume timer, triggering the RRC connection re-establishment procedure.

According to the disclosed control method, the method further comprises: sending a message to a base station, the message indicating information related to the failure; and receiving a radio resource control (RRC) reconfiguration message, where: if the MCG transmission is suspended, resuming SRB transmission, resuming DRB transmission and resuming split SRB transmission to corresponding suspended SRB on the MCG transmission, suspended DRB on the MCG transmission and suspended split SRB on the MCG transmission; and if the MCG transmission is not suspended, performing corresponding configurations based on information in the RRC reconfiguration message.

According to the disclosed control method, the method further comprises: sending a message to a base station, the message indicating information related to the failure; and receiving a radio resource control (RRC) reconfiguration message, where: if the RRC reconfiguration message is a first RRC reconfiguration message received after the message is sent, executing RRC reconfiguration operations for corresponding suspended SRB on the MCG transmission, suspended DRB on the MCG transmission and suspended split SRB on the MCG transmission; and if the RRC reconfiguration message is not the first RRC reconfiguration message after the message is sent, performing corresponding configurations based on information indicated in the RRC reconfiguration message.

According to the disclosed control method, after it is detected that failure has occurred and before a radio resource control (RRC) reconfiguration message is received, the method further comprises:
detecting that a failure has occurred in the SCG transmission; if the MCG transmission is suspended or a timer is running, initiating an RRC connection re-establishment procedure; and if the MCG transmission is not suspended or a timer is stopped or not running, triggering a procedure to send SCG failure information for reporting SCG failure.

According to a second aspect of the present disclosure, there is provided a user equipment, comprising: a processor; and a memory storing instructions; where the instructions, when executed by the processor, cause the user equipment to carry out a control method according to disclosed control method.

DESCRIPTION

The following contains detailed disclosure of exemplary implementations of the present disclosure. It should be appreciated that the present disclosure is not limited to the disclosed implementations. Additionally, for the ease of understanding, the disclosure does not include detailed disclosure of general knowledge not directly related to the present disclosure in order to avoid confusion of the present disclosure.

Prior to detailed disclosure of the implementations, the following paragraphs define the terms used in the present disclosure. Unless otherwise specified, the terms in the present disclosure have the following meanings.

Figure 1:
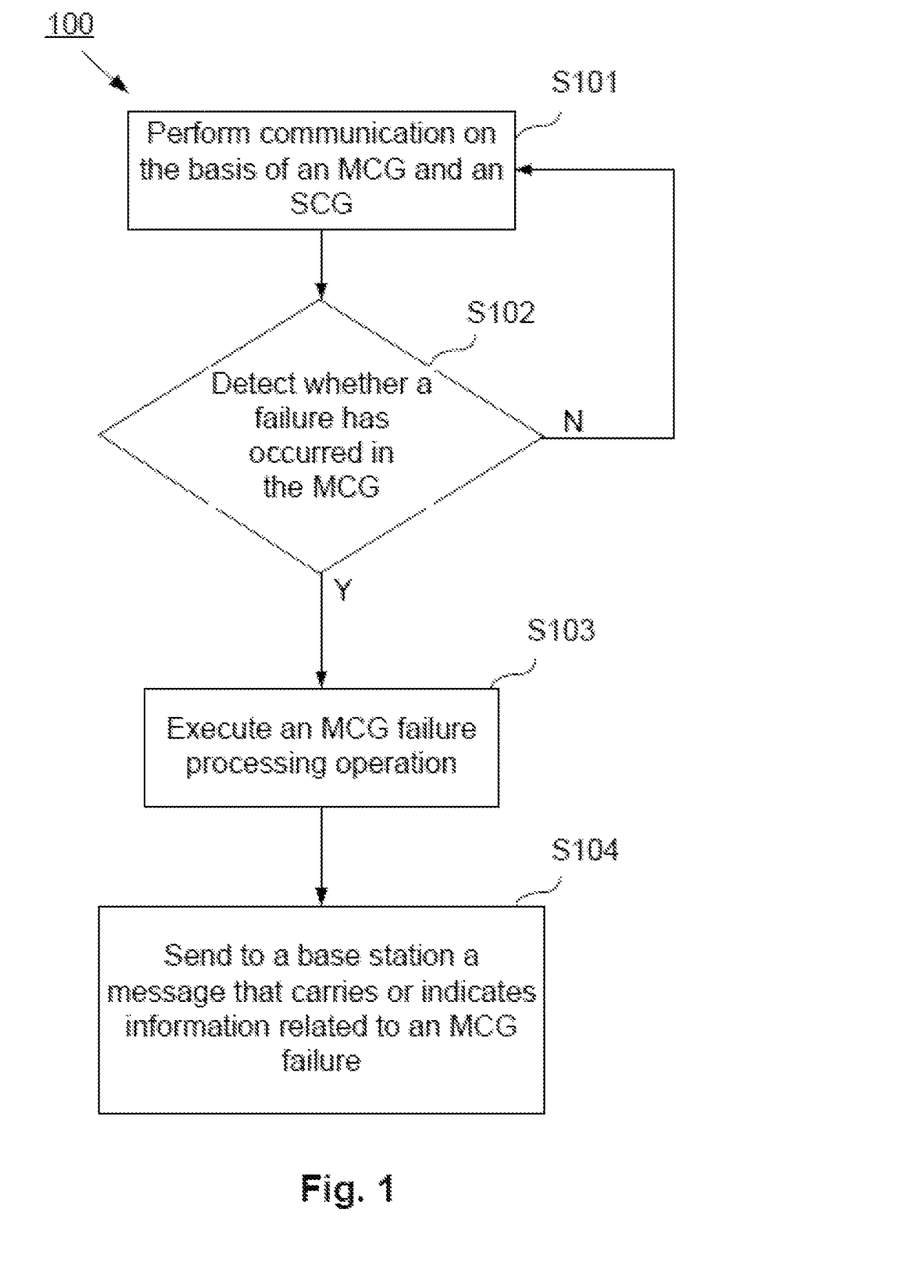
FIG. 1 illustrates a flow chart of a control method for UE according to an implementation of the present disclosure.

UE User Equipment
NR New Radio
eLTE Enhanced Long Term Evolution
E-UTRA Evolved Universal Terrestrial Radio Access
DC Dual Connectivity
MC Multi Connectivity
gNB next generation node B (i.e., a base station node that provides a UE with NR user plane and control plane protocol stack and connects to the 5G core network
eNB evolved node B (i.e., a base station node that provides a UE with E-UTRAN user plane and control plane protocol stack and connects to the EPC core network)
ng-eNB next generation-evolved node B (i.e., a base station node that provides a UE with E-UTRAN user plane and control plane protocol stack and connects to the 5G core network)
SRB Signaling radio bearer
DRB Data radio b bearer
Split SRB Split signaling radio bearer
RLC Radio link control
PDCP Packet Data convergence Protocol
MAC Medium Access Control The following discloses a control method for UE according to the present disclosure, and more specifically, an access control method for UE. FIG. 1 illustrates a flow chart of a control method 100 for UE according to an implementation of the present disclosure.

At step S101, the UE performs communications with base stations of a master cell group (MCG) and a secondary cell group (SCG).

At step S102, the UE detects whether a failure has occurred in the MCG transmission. The failure in the MCG transmission includes at least one of the following conditions: an MCG wireless connection failure; an MCG lower layer indicating integrity protection check failure; RLC instructions of the MCG reach a maximum allowable number of transmission times or a maximum allowable number of re-transmission times; and the MCG MAC reporting a random access problem.

At step S102, if it is detected that a failure has occurred in the MCG transmission, the method proceeds to step S103. At step 103, the UE executes a processing operation when a failure has occurred in the MCG, and the processing operation is called an "MCG failure processing operation."

The "MCG failure processing operation" includes at least one of the following: suspending all SRB transmission via the MCG; suspending all DRB transmission on the MCG; suspending all SRB transmission via the MCG except for SRB0; suspending split SRB transmission via the MCG; suspending all MCG SRB except for SRB0; and suspending all MCG DRB.

Subsequently, at step S104, the UE sends to the base station a message that carries or indicates information related to an MCG failure. More specifically, the message is transmitted via split SRB. For example, a SRB1 is configured as split SRB, and the message is sent via the SRB1.

Additionally, at step S102, when in the UE does not detect that a failure has occurred in the MCG transmission, which is also when the MCG transmission has not failed, the method returns to step S101 and the UE continues to perform communication with the MCG and the SCG.

Figure 2:
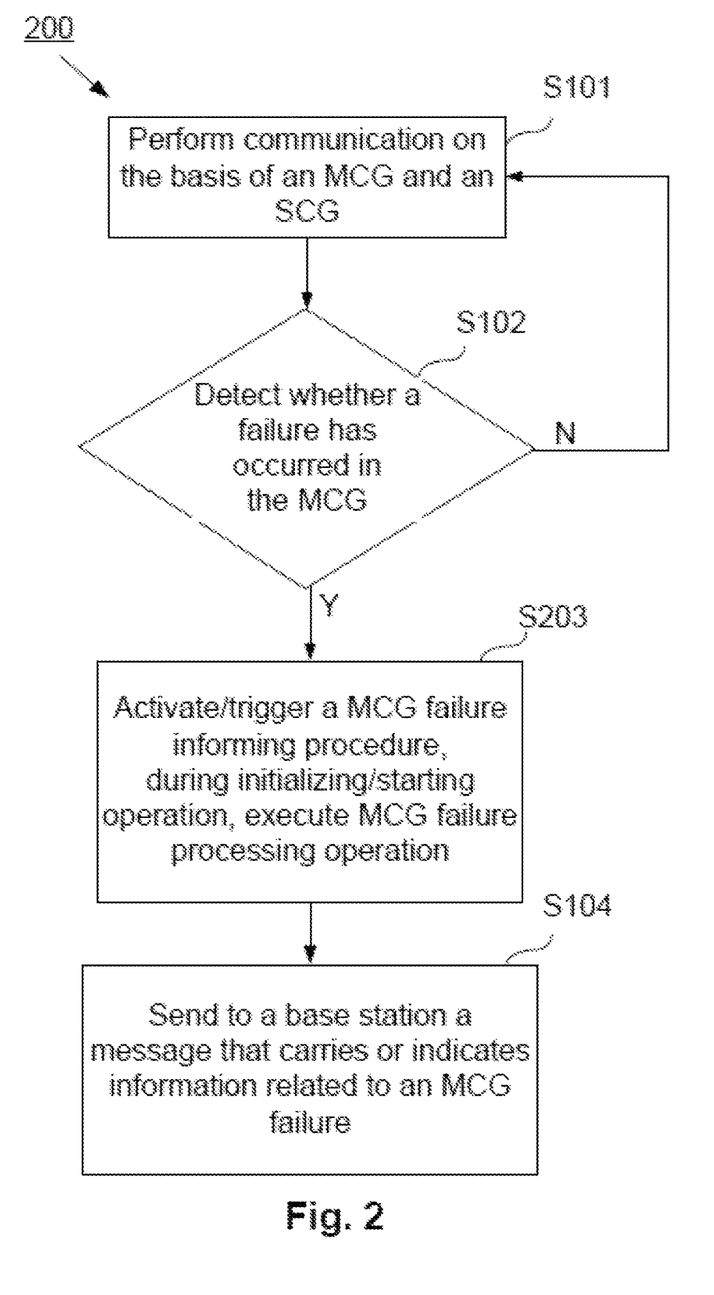
FIG. 2 illustrates a flow chart of a control method for UE according to an implementation of the present disclosure.

FIG. 2 illustrates a flow chart of a control method 200 for UE according to an implementation of the present disclosure. The control method 200 for UE is different from the control method 100 for UE in that step S203 replaces step S103, and the other steps are the same as the disclosed control method 100. The following disclosure explains the differences in detail, and the explanations of the same steps are omitted.

At step S102, the UE detects that a failure has occurred in the MCG transmission and proceeds to step S203. At step S203, the UE activates or triggers an MCG failure informing procedure, and during/upon an initializing or starting operation of the MCG failure informing procedure, executes the MCG failure processing operation as disclosed.

The present disclosure further is a control method for UE when the UE detects a failure has occurred in the MCG transmission and a failure has also occurred in the SCG transmission.

When the UE detects that a failure has occurred in the MCG transmission, the UE starts a resume timer. With respect to the resume timer, it may be started when the UE detects any disclosed failure in the MCG. The resume timer may also be started when the UE sends to a base station a message that carries or indicates information related to an MCG failure.

During the running of the resume timer, if the UE detects a failure occurred in the SCG (or in the SCG transmission), the UE triggers an RRC connection re-establishment procedure; and, if the UE receives an RRC reconfiguration message, the UE stops the timer. When the resume timer expires, the UE triggers an RRC connection re-establishment procedure.

The failure in SCG includes at least one of the following: an SCG wireless connection failure; an SCG lowest layer indicating integrity protection check failure; RLC instructions of the SCG reach a maximum allowable number of transmission times or a maximum allowable number of re-transmission times; and an SCG MAC indicating a random access problem.

As stated previously, the implementations of the present disclosure are provided as exemplary implementations for the ease of understanding. The present disclosure is not limited to the disclosed implementations.

Implementation 1

Step 1: the UE detects at least one of the following failure conditions in the MCG:
  an MCG wireless connection failure;
  an MCG lower layer (e.g. PDCP layer) instruction indicating an integrity protection check failure;
  RLC instructions of the MCG reach a maximum allowable number of transmission times or a maximum allowable number of re-transmission times;
  an MCG MAC reporting a random access problem.

Step 2: the UE executes at least one of the following operations:
  suspend all SRB transmission via the MCG;
  suspend all DRB transmission via the MCG;
  suspend all SRB transmission via the MCG except for SRB0;
  suspend split SRB transmission via the MCG;
  suspend all MCG SRB except for SRB0;
  suspend all MCG DRB.

The MCG SRB refers to the signaling bearer under dual connectivity or multi connectivity. The RLC and MAC logical channel configurations of the signaling bearer only configure/operate in the MCG.

The MCG DRB refers to the data bearer under dual connectivity or multi connectivity. The RLC and MAC logical channel configurations of the data bearer only configure/operate for the MCG.

The split SRB refers to the signaling bearer between the MN and the UE. The RLC and MAC logical channel configurations of the bearer are configured/operated for the MCG and SCG.

Figure 3:
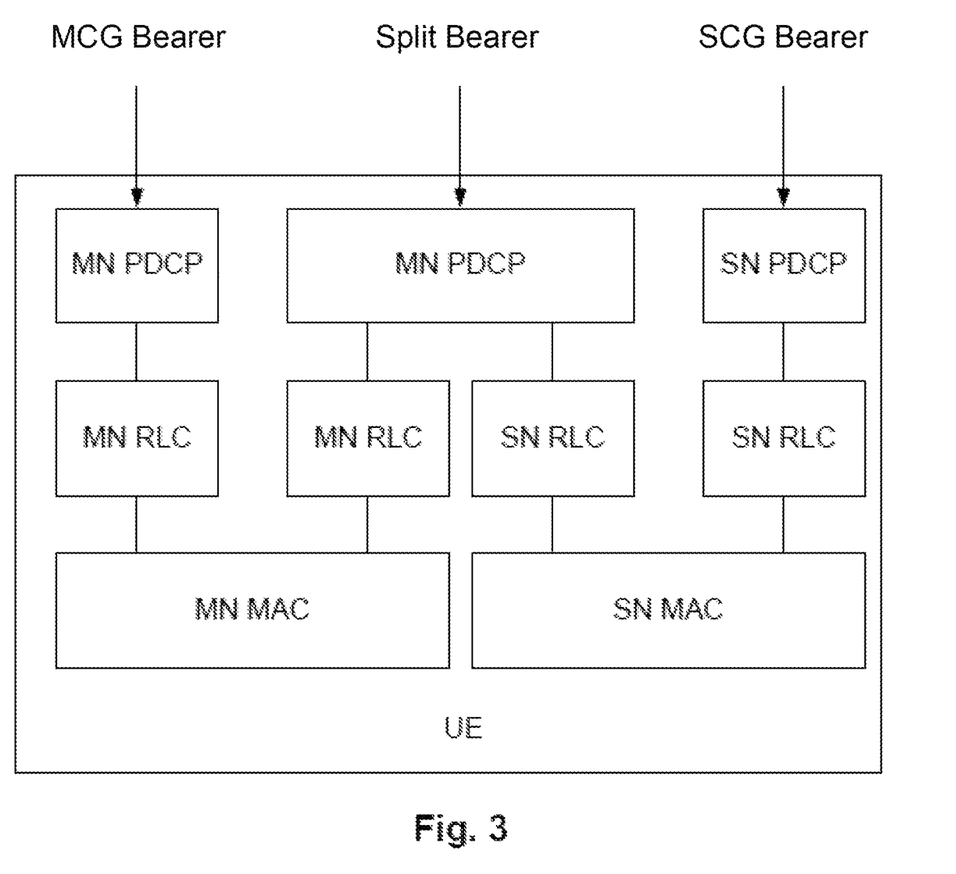
FIG. 3 illustrates a UE communicating with MCG and SCG bearers according to an implementation of the present disclosure.

The MCG SRB, MCG DRB, split SRB are illustrated in FIG. 3. The bearer in FIG. 3 may be a SRB or a DRB.

Suspending SRB/DRB transmission via the MCG refers to pausing/stopping SRB/DRB data receiving and sending via an MCG. If the RLC and MAC logical channel configurations for those SRB/DRB are configured for the MCG and SCG, this type of SRB/DRB data may still be received and sent via an SCG.

Suspending split SRB transmission on the MCG refers to pausing/stopping split SRB data receiving and sending via an MCG. Since the RLC and MAC logical channel configuration for the split SRB is configured in the MCG and SCG, the data may still be received and sent via an SCG despite the transmission of such has been paused/stopped on the MCG.

Suspending SRB/DRB is different from suspending SRB/DRB transmission via the MCG. Suspending SRB/DRB refers to pausing/stopping SRB/DRB operation. The PDCP entity of suspended SRB/DRB and the RLC entity of suspended SRB/DRB stops generating or processing data packets and the corresponding timers are also stopped. The suspended SRB/DRB information is saved in the UE context for resuming the SRB/DRB later.

Step 3: the UE sends to a base station a message that carries or indicates information related to an MCG failure. In the message, optionally, the UE may report that at least one of the disclosed failure conditions has occurred on the MCG. The message is transmitted via the split SRB in Step 2. For example, a SRB1 is configured as split SRB, and the message is sent via the SRB1.

Implementation 2

Implementation 2 is yet another implementation of Implementation 1. The following is detailed disclosure of this implementation.

Step 1: the UE detects at least one of the following failure conditions in the MCG:
  an MCG wireless connection failure;
  an MCG lower layer indicating integrity protection check failure;
  RLC instructions of the MCG reach a maximum allowable number of transmission times or a maximum allowable number of re-transmission times;
  an MCG MAC reporting a random access problem.

Step 2: the UE activates/triggers a procedure of sending to a base station a message that carries or indicates information related to the MCG failure.

During/Upon an initializing or starting operation of the procedure, the UE executes at least one of the following:
  suspending all SRB transmission via the MCG;
  suspending all DRB transmission via the MCG;
  suspending all SRB transmission via the MCG except for SRB0;
  suspending split SRB transmission via the MCG;
  suspend all MCG SRB except for SRB0;
  suspending all MCG DRB.

Step 3: the UE sends to a base station a message that carries or indicates information related to an MCG failure. In the message, optionally, the UE may report that at least one of the disclosed failure conditions has occurred on the MCG. The message is transmitted via the split SRB in Step 2. For example, a SRB1 is configured as split SRB, and the message is sent via the SRB1.

Implementation 3

The difference between Implementation 3 and Implementation 1 is that a timer is started, which is called a resume timer in this example, when the UE detects at least one of the following failure conditions in the MCG:
- an MCG wireless connection failure;
- an MCG lower layer (e.g. PDCP layer) instruction indicating an integrity protection check failure;
- RLC instructions of the MCG reach a maximum allowable number of transmission times or a maximum allowable number of re-transmission times;
- an MCG MAC reporting a random access problem.

During the running of the resume timer, the UE triggers an RRC connection re-establishment procedure, when the UE detects at least one of the following failure conditions has occurred in the SCG:
- an SCG wireless connection failure;
- an SCG lowest layer indicating integrity protection check failure;
- RLC instructions of the SCG reach a maximum allowable number of transmission times or a maximum allowable number of re-transmission times;
- an SCG MAC indicating a random access problem.

When the resume timer expires, the UE triggers an RRC connection re-establishment procedure.

During the running of the resume timer, if the UE receives an RRC reconfiguration message, the UE stops the timer.

Implementation 4

The difference between Implementation 4 and Implementation 3 is that the resume timer is started when the UE sends to a base station a message that carries or indicates information related to the MCG failure.

The resume timer may be started when the UE initiates sending to the base station the message that carries or indicates information related to the MCG failure. Additionally, the resume timer may be started when the UE delivers to a lower layer the message that carries or indicates information related to the MCG failure. The resume timer may further be started after the UE triggers sending to the base station the message that carries or indicates information related to the MCG failure.

During the running of the resume timer, the UE triggers an RRC connection re-establishment procedure, when the UE detects at least one of the following failure conditions has occurred in the SCG:
- an SCG wireless connection failure;
- an SCG lowest layer indicating integrity protection check failure;
- RLC instructions of the SCG reach a maximum allowable number of transmission times or a maximum allowable number of re-transmission times;
- an SCG MAC indicating a random access problem.

When the resume timer expires, the UE triggers an RRC connection re-establishment procedure.

During the running of the resume timer, if the UE receives an RRC reconfiguration message, the UE stops the timer.

Implementation 5

Implementation 5 is a combination of Implementations 1 and 3, or a combination of Implementation 1 and 4. After Step 1 of Implementation 1, the UE does not always proceed to Step 2 and Step 3, but may proceed with the following steps.

Step 1: the UE detects at least one of the following failure conditions in the MCG:
- an MCG wireless connection failure;
- an MCG lower layer indicating integrity protection check failure;
- RLC instructions of the MCG reach a maximum allowable number of transmission times or a maximum allowable number of re-transmission times;
- an MCG MAC reporting a random access problem.

If the UE is configured with a resume timer or a time period of a resume timer, the UE continues executing Step 2 and Step 3 as disclosed in Implementation 1, and starts the resume timer and performs subsequent operations as disclosed in Implementation 3 or 4.

If the UE is not configured with a resume timer or a time period of a resume timer, the UE triggers an RRC connection re-establishment procedure.

Implementation 6

Implementation 6 is a combination of Implementations 2 and 3, or a combination of Implementation 2 and 4. After Step 1 of Implementation 2, the UE does not always proceed to Step 2 and Step 3, but may proceed with the following steps.

Step 1: the UE detects at least one of the following failure conditions in the MCG:
- an MCG wireless connection failure;
- an MCG lower layer indicating integrity protection check failure;
- RLC instructions of the MCG reach a maximum allowable number of transmission times or a maximum allowable number of re-transmission times;
- an MCG MAC reporting a random access problem.

If the UE is configured with a resume timer or a time period of a resume timer, the UE continues executing Step 2 as disclosed in Implementation 2, which is activating/triggering a procedure of sending to a base station a message that carries or indicates information related to the MCG failure, and starts the resume timer and performs subsequent operations as disclosed in Implementation 3 or 4.

If the UE is not configured with a resume timer or a time period of a resume timer, the UE triggers an RRC connection re-establishment procedure.

Implementation 7

After the UE sends to a base station a message that carries or indicates information related to an MCG failure, the UE may receive an RRC reconfiguration message. When the UE receives the RRC reconfiguration message, if the UE MCG transmission is suspended, the UE executes at least one of the following operations:

For the suspended SRB transmission on the MCG, the UE executes one or more of the following operations:
- executing a PDCP data recovery of the SRB;
- re-establishing the PDCP entity of the SRB;
- re-establishing the RLC entity of the SRB;
- resuming the suspended SRB transmission on the MCG.

For the suspended DRB transmission on the MCG, the UE executes one or more of the following operations:
- executing a PDCP data recovery of the DRB;
- re-establishing the PDCP entity of the DRB;
- re-establishing the RLC entity of the DRB;
- resuming the suspended DRB transmission on the MCG.

For the suspended split SRB transmission on the MCG, the UE executes one or more of the following operations:
- executing a PDCP data recovery;
- re-establishing the PDCP entity of the split SRB;
- re-establishing the RLC entity of the split SRB;
- resuming the suspended split SRB transmission on the MCG.

Preferably, if the split SRB is SRB1, then for the suspended SRB1 transmission on the MCG, the UE executes one or more of the following operations:

executing a PDCP data recovery of the SRB1;
re-establishing the PDCP entity of the SRB1;
re-establishing the RLC entity of the SRB1;
resuming the suspended SRB1 transmission on the MCG.

For the suspended DRB, the UE restores its PDCP status, re-establishes PDCP entity, and resumes the suspended DRB. For the suspended SRB, the UE restores its PDCP status and re-establishes PDCP entity, and resume the suspended SRB.

If the UE MCG transmission is suspended, the suspending procedure is as disclosed in Implementation 1. Specifically, the UE suspends the MCG transmission before receiving the RRC reconfiguration message as disclosed in Implementation 1. If the UE MCG transmission is not suspended, the UE performs corresponding configurations based on information in the RRC reconfiguration message.

Variation of Implementation 7

In a variation of Implementation 7, the UE receives an RRC reconfiguration message. If the RRC reconfiguration message is the first RRC reconfiguration message received after the UE sends to a base station a message that carries or indicates information related to the MCG failure as in Implementation 1, the UE, upon receiving the RRC reconfiguration message, executes at least one of the following operations:

For the suspended SRB transmission on the MCG, the UE executes one or more of the following operations:
executing a PDCP data recovery of the SRB;
re-establishing the PDCP entity of the SRB;
re-establishing the RLC entity of the SRB;
resuming the suspended SRB transmission on the MCG.

For the suspended DRB transmission on the MCG, the UE executes one or more of the following operations:
executing a PDCP data recovery of the DRB;
re-establishing the PDCP entity of the DRB;
re-establishing the RLC entity of the DRB;
resuming the suspended DRB transmission on the MCG.

For the suspended split SRB transmission on the MCG, the UE executes one or more of the following operations:
executing a PDCP data recovery;
re-establishing the PDCP entity of the split SRB;
re-establishing the RLC entity of the split SRB;
resuming the suspended split SRB transmission on the MCG.

Preferably, if the split SRB is SRB1, then for the suspended SRB1 transmission on the MCG, the UE executes one or more of the following operations:
executing a PDCP data recovery of the SRB1;
re-establishing the PDCP entity of the SRB1;
re-establishing the RLC entity of the SRB1;
resuming the suspended SRB1 transmission on the MCG.

For the suspended DRB, the UE restores its PDCP status and re-establishes PDCP entity, and resumes the suspended DRB.

For the suspended SRB, the UE restores its PDCP status, re-establishes the PDCP entity and resumes the suspended SRB.

If the RRC reconfiguration message is not the first RRC reconfiguration message received after the UE sends a message that carries or indicates information related to the MCG failure as in Implementation 1, the UE performs corresponding configurations based on information indicated in the RRC reconfiguration message.

The UE performs corresponding suspension operations concurrently or before the UE sends a message that carries or indicates information related to the MCG failure, and, as indicated in Implementations 1 and 2, the decision condition "whether the UE receives an RRC reconfiguration message after the UE sends a message that carries or indicates information related to the MCG failure" is deemed to be equivalent to the decision condition "whether the UE MCG transmission is suspended."

The disclosed PDCP data recovery procedure may refer to the disclosure in 3GPP Technical Specification 38.323 Section 5.5.

Implementation 8

After the UE detects that a failure has occurred in the MCG and before the UE receives an RRC reconfiguration message, the UE may detect that a failure has occurred in the SCG. When the UE detects a failure has occurred in the SCG, the UE determines whether to perform an RRC connection re-establishment procedure or trigger an SCG failure information transmission procedure according to the MCG transmission.

The UE detects that at least one of the following failure conditions has occurred in the SCG:
an SCG wireless connection failure;
an SCG lowest layer indicating integrity protection check failure;
RLC instructions of the SCG reach a maximum allowable number of transmission times or a maximum allowable number of re-transmission times;
an SCG MAC indicating a random access problem.

If the MCG transmission is suspended, the UE triggers/activates an RRC connection re-establishment procedure. If the MCG transmission is not suspended, the UE triggers/activates a procedure to send SCG failure information for reporting SCG failure.

The following MCG transmission operation is also disclosed in Implementation 1.

Variation of Implementation 8

In this a variation of Implementation 7, when the UE detects a failure has occurred in the SCG, the UE determines whether to perform an RRC connection re-establishment procedure or trigger an SCG failure information transmission procedure according to a resume timer.

The UE detects at least one of the following failure conditions has occurred in the SCG:
an SCG wireless connection failure;
an SCG lowest layer indicating integrity protection check failure;
RLC instructions of the SCG reach a maximum allowable number of transmission times or a maximum allowable number of re-transmission times;
an SCG MAC indicating a random access problem.

If the resume timer is running, the UE triggers/activates an RRC connection re-establishment procedure. If the resume timer is not running, the UE triggers/activates a procedure to send SCG failure information for reporting SCG failure.

The following MCG transmission operation is also disclosed in Implementation 1.

The UE performs corresponding suspension operations and starts the resume timer concurrently or before the UE sends a message that carries or indicates information related to the MCG failure, and as indicated in Implementations 3 and 4, the decision condition "whether the UE MCG transmission is suspended" is deemed to be equivalent to the decision condition "whether the resume timer is running."

Figure 4:
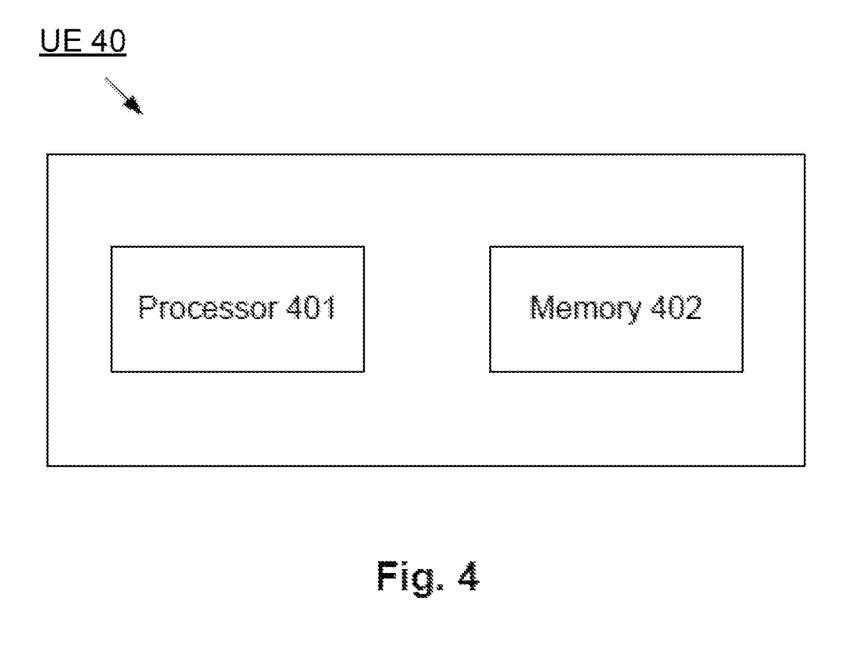
FIG. 4 illustrates a user equipment according to an implementation of the present disclosure.

FIG. 4 illustrates a user equipment 40 according to an implementation of the present disclosure. As illustrated in FIG. 4, the user equipment 40 comprises a processor 401 and a memory 402. The processor 401 may comprise a microprocessor, a microcontroller, an embedded processor, etc.

The memory 402 may comprise volatile memory (e.g., random access memory RAM), a hard disk drive (HDD), non-volatile memory (e.g., flash memory), or any other memories. The memory 402 stores program instructions. The program instructions, when executed by the processor 401, cause the user equipment to carry out the communication control disclosed methods.

According to the present disclosure, executing programs stored on equipment may be implemented by controlling a Central Processor Unit (CPU) and causing a computer to perform the functions of the present disclosure. The program or the information being processed by the program may be stored in volatile memory (e.g., random access memory (RAM)), a hard disk drive (HDD), non-volatile memory (e.g., flash memory), or any other suitable memory system.

The program that performs the disclosed functions may be stored on a computer-readable medium. Computer systems, by accessing the programs stored in the storage medium execute the programs to perform the corresponding functions. The disclosed "computer system" may be a computer system embedded in equipment, may include an operating system or hardware (e.g., peripheral equipment). A "computer-readable medium" may be a semiconductor storage medium, optical storage medium, a magnetic storage medium, a storage medium for short-term dynamic storing of programs, or any other storage medium readable by a computer.

Various characteristics or functions disclosed herein may be performed or implemented by electronics such as a monolithic or multiple-chip integrated circuit. The electronics designed for implementing the disclosed functions may include general processors, a digital signal processor (DSP), Applications Specific Integrated Circuitry (ASIC), Field Programmable Gate Arrays (FPGAs) or any other programmable logic devices, discrete gate or transistor logic, discrete hardware assembly, or any combination of the disclosed devices.

A general processor may be a microprocessor, or any present processor, controller, microcontroller, or state machine. The disclosed electronics may be digital electronics or analog electronics. As semiconductor technology continues to improve, it is noted that there may be new integrated circuit technology replacing present integrated circuits, one or more implementations of the present disclosure may be implemented with the new integrated circuit technology.

The present disclosure is not limited to the disclosed implementations. Although various examples are disclosed, it should be noted that the present disclosure is not limited thereto. Fixed or non-mobile electronic equipment installed indoor or outdoor may be in a form of terminal equipment or communications equipment. For example, the electronic equipment may be Audio-Video equipment.

The implementations of the present disclosure are disclosed in detail with reference to the accompanying drawings. However, the implementations are not limited to the disclosed implementations. The present disclosure may also include design variations without departing from the scope or spirit of the disclosed concepts. Furthermore, the present disclosure also encompasses modifications within the scope of the claims, implementations suitably combining various disclosed implementations. Additionally, the disclosed implementations may have component substitutions that have similar effect.

What is claimed is:

1. A control method for a user equipment (UE), the control method comprising:
    communicating with a master cell group (MCG) and a secondary cell group (SCG); and
    upon detecting a failure in an MCG transmission:
        executing an MCG failure processing operation,
        sending a message to a base station indicating information related to the failure,
        starting a resume timer upon sending the message to the base station, and
        triggering a radio resource control (RRC) connection re-establishment procedure when the resume timer expires.

2. The control method according to claim 1, wherein:
    sending the message to the base station and starting the resume timer are part of an MCG failure informing procedure that is initiated upon detecting the failure in the MCG transmission, and
    the MCG failure informing procedure executes the MCG failure processing operation.

3. The control method according to claim 1, wherein the MCG failure processing operation includes at least one of:
    suspending all signaling radio bearer (SRB) transmissions via the MCG;
    suspending all data radio bearer (DRB) transmissions via the MCG;
    suspending all the SRB transmissions via the MCG except for SRB0;
    suspending split SRB transmissions via the MCG;
    suspending all MCG SRBs except for the SRB0; and
    suspending all MCG DRBs.

4. The control method according to claim 1, further comprising:
    while the resume timer is running, triggering the RRC connection re-establishment procedure upon detecting a failure in an SCG transmission, and
    while the resume timer is running, in response to determining that an RRC reconfiguration message is received, stopping the resume timer.

5. The control method according to claim 4, wherein:
    the failure in the MCG transmission is detected when at least one of the following conditions is met:
        an MCG wireless connection failure is detected;
        an MCG lower layer indicating an integrity protection check failure;
        radio link control (RLC) instructions of the MCG reaching a maximum allowable number of transmission times or a maximum allowable number of re-transmission times; and
        an MCG medium access control (MAC) layer reporting a random access problem; and
    the failure in the SCG transmission is detected when at least one of the following conditions is met:
        an SCG wireless connection failure is detected;
        an SCG lower layer indicating an integrity protection check failure;
        RLC instructions of the SCG reaching a maximum allowable number of transmission times or a maximum allowable number of re-transmission times; and
        an SCG MAC layer indicating a random access problem.

6. The control method according to claim 1, further comprising, upon detecting the failure in the MCG transmission:
    when the UE is configured with the resume timer or a time period of the resume timer, executing the MCG failure processing operation, sending the message to the base station that indicates the information related to the failure, and starting the resume timer; and when the UE is not configured with the resume timer or the time period for the resume timer, triggering the RRC connection re-establishment procedure.

7. The control method according to claim 1, further comprising, in response to sending the message to the base station:

receiving an RRC reconfiguration message; and when the MCG transmission is suspended, resuming signaling radio bearer (SRB) transmission, resuming data radio bearer (DRB) transmission, and resuming split SRB transmission associated, respectively, with suspended SRB on the MCG transmission, suspended DRB on the MCG transmission, and suspended split SRB on the MCG transmission.

8. The control method according to claim 1, further comprising, in response to sending the message to the base station:

receiving an RRC reconfiguration message, wherein:

when the RRC reconfiguration message is a first RRC reconfiguration message received after the message is sent, executing RRC reconfiguration operations for corresponding suspended signaling radio bearer (SRB) on the MCG transmission, suspended data radio bearer (DRB) on the MCG transmission, and suspended split SRB on the MCG transmission; and when the RRC reconfiguration message is not the first RRC reconfiguration message after the message is sent, performing corresponding configuration operations based on information indicated in the RRC reconfiguration message.

9. The control method according to claim 1, further comprising, upon detecting the failure has occurred in the MCG transmission and before an RRC reconfiguration message is received:

upon detecting a failure in an SCG transmission:

when the MCG transmission is suspended and the resume timer is running, triggering the RRC connection re-establishment procedure; and when the MCG transmission is not suspended and the resume timer is stopped or not running, triggering a procedure to send SCG failure information for reporting an SCG failure.

10. A user equipment (UE), comprising:

at least one processor; and at least one memory coupled to the at least one processor and storing one or more instructions, which when executed by the at least one processor, cause the UE to:

communicate with a master cell group (MCG) and a secondary cell group (SCG); and upon detecting a failure in an MCG transmission:

execute an MCG failure processing operation, send a message to a base station indicating information related to the failure, start a resume timer upon sending the message to the base station, and trigger a radio resource control (RRC) connection re-establishment procedure when the resume timer expires.

11. The UE according to claim 10, wherein:

sending the message to the base station and starting the resume timer are part of an MCG failure informing procedure that is initiated upon detecting the failure in the MCG transmission, and the MCG failure informing procedure executes the MCG failure processing operation.

12. The UE according to claim 10, wherein the MCG failure processing operation includes at least one of:

suspending all signaling radio bearer (SRB) transmissions via the MCG;

suspending all data radio bearer (DRB) transmissions via the MCG;

suspending all the SRB transmissions via the MCG except for SRB0;

suspending split SRB transmissions via the MCG;

suspending all MCG SRBs except for the SRB0; and suspending all MCG DRBs.

13. The UE according to claim 10, wherein, if it is detected that the failure has occurred in the MCG transmission, or when the message is sent to the base station indicating the information related to the failure, the instructions, when executed by the processor, further cause the UE to:

while the resume timer is running, trigger the RRC connection re-establishment procedure upon detecting a failure in an SCG transmission, and while the resume timer is running, in response to determining that an RRC reconfiguration message is received, stop the resume timer.

14. The UE according to claim 13, wherein:

the failure in the MCG transmission is detected when at least one of the following conditions is met:

an MCG wireless connection failure is detected;

an MCG lower layer indicating an integrity protection check failure;

radio link control (RLC) instructions of the MCG reaching a maximum allowable number of transmission times or a maximum allowable number of re-transmission times; and an MCG medium access control (MAC) layer reporting a random access problem; and the failure in the SCG transmission is detected when at least one of the following conditions is met:

an SCG wireless connection failure is detected;

an SCG lower layer indicating an integrity protection check failure;

RLC instructions of the SCG reaching a maximum allowable number of transmission times or a maximum allowable number of re-transmission times; and an SCG MAC layer indicating a random access problem.

15. The UE according to claim 10, wherein, if it is detected that the failure has occurred in the MCG transmission, the instructions, when executed by the processor, further cause the UE to:

when the UE is configured with the resume timer or a time period of the resume timer, execute the MCG failure processing operation, send the message to the base station that indicates the information related to the failure, and start the resume timer; and when the UE is not configured with the resume timer or the time period for the resume timer, trigger the RRC connection re-establishment procedure.

16. The UE according to claim 10, wherein, the instructions, when executed by the at least one processor, further cause the UE to, in response to sending the message to the base station:

receive an RRC reconfiguration message; and when the MCG transmission is suspended, resume signaling radio bearer (SRB) transmission, resume data radio bearer (DRB) transmission, and resume split SRB transmission to associated, respectively, with suspended SRB on the MCG transmission, suspended DRB on the MCG transmission and suspended split SRB on the MCG transmission.

17. The UE according to claim 10, wherein, the instructions, when executed by the at least one processor, further cause the UE to, in response to sending the message to the base station:

receive an RRC reconfiguration message, wherein:

when the RRC reconfiguration message is a first RRC reconfiguration message received after the message is sent, execute RRC reconfiguration operations for corresponding suspended signaling radio bearer (SRB) on the MCG transmission, suspended data radio bearer (DRB) on the MCG transmission, and suspended split SRB on the MCG transmission; and when the RRC reconfiguration message is not the first RRC reconfiguration message after the message is sent, perform corresponding configuration operations based on information indicated in the RRC reconfiguration message.

18. The UE according to claim 10, wherein, after it is detected that the failure has occurred in the MCG transmission and before a radio resource control (RRC) reconfiguration message is received, the instructions, when executed by the processor, further cause the UE to:

upon detecting a failure in an SCG transmission:

when the MCG transmission is suspended and the resume timer is running, triggering the RRC connection re-establishment procedure; and when the MCG transmission is not suspended and the resume timer is stopped or not running, trigger a procedure to send SCG failure information for reporting an SCG failure.

* * * * *